United States Patent [19]

Adiletta et al.

[11] Patent Number: 4,805,131

[45] Date of Patent: Feb. 14, 1989

[54] BCD ADDER CIRCUIT

[75] Inventors: Matthew J. Adiletta, Worcester; Virginia C. Lamere, Upton, both of Mass.

[73] Assignee: Digital Equipment Corporation, Maynard, Mass.

[21] Appl. No.: 72,161

[22] Filed: Jul. 9, 1987

[51] Int. Cl.[4] .............................................. G06F 7/50
[52] U.S. Cl. ................................... 364/783; 364/771; 364/787
[58] Field of Search ................ 364/771, 778, 780–783, 364/787, 768

[56] References Cited

U.S. PATENT DOCUMENTS

| | | | |
|---|---|---|---|
| 3,935,438 | 1/1976 | Grupe | 364/783 |
| 4,001,570 | 1/1977 | Gooding | 364/783 |
| 4,172,288 | 10/1979 | Anderson | 364/771 |
| 4,638,300 | 1/1987 | Miller | 364/781 |
| 4,707,799 | 11/1987 | Ishikawa | 364/771 |
| 4,718,033 | 1/1988 | Miller | 364/771 |

FOREIGN PATENT DOCUMENTS

86/04699 8/1986 PCT Int'l Appl. ................ 364/771

OTHER PUBLICATIONS

Agrawal, D. P., "Fast BCD/Binary Adder/Subtractor", *Electronics Letters*, vol. 10, #8, pp. 121–122, 4/18/74.

Cavanagh, Joseph J. F., Digital Computer Arithmetic, Design and Implementation, pp. 306–311 (McGraw-Hill Book Company 1984).

*Primary Examiner*—Gary V. Harkcom
*Assistant Examiner*—Dale M. Shaw
*Attorney, Agent, or Firm*—Finnegan, Henderson, Farabow, Garrett, & Dunner

[57] ABSTRACT

The binary coded decimal (BCD) adder circuit for adding two BCD encoded operands and for producing a BCD encoded sum includes a bank of parallel full adder circuits as a first stage which generate an intermediate sum vector and an intermediate carry vector from the sum of the operands and a precorrection factor. A second stage of the BCD adder circuit includes carry lookahead adder circuitry receiving as inputs the intermediate sum vector and the intermediate carry vector and producing a propagate vector and a final carry vector. The third stage of the BCD adder circuit conditionally modifies the propagate vector to form the BCD encoded sum according to bits of the intermediate carry vector and the final carry vector as inputs.

9 Claims, 11 Drawing Sheets

FIG. 2. GENERAL BLOCK DIAGRAM

FIG. 8B.
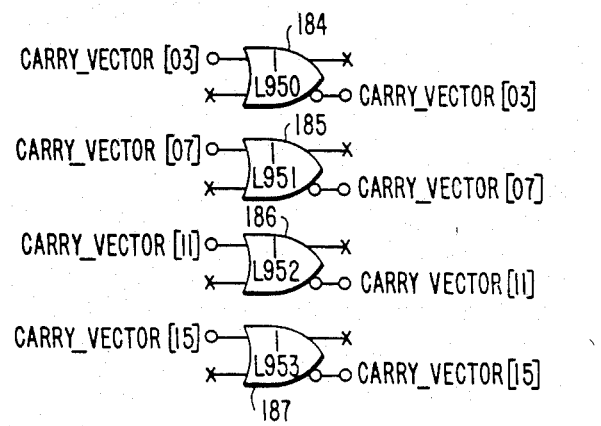
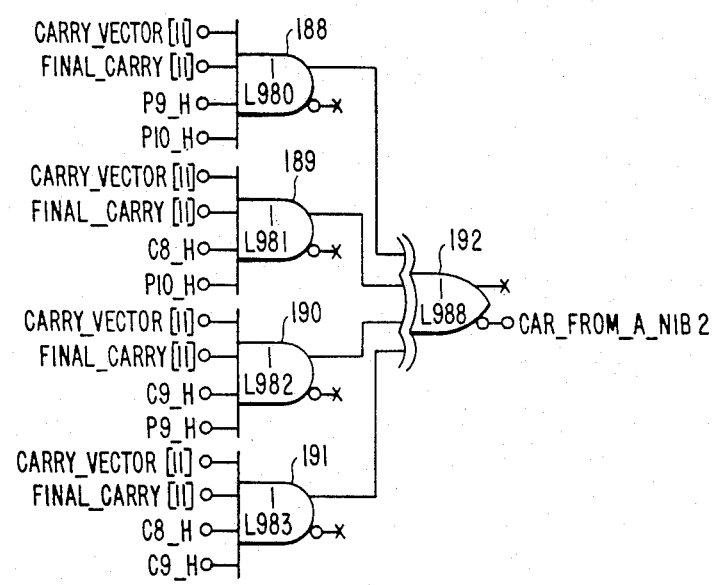
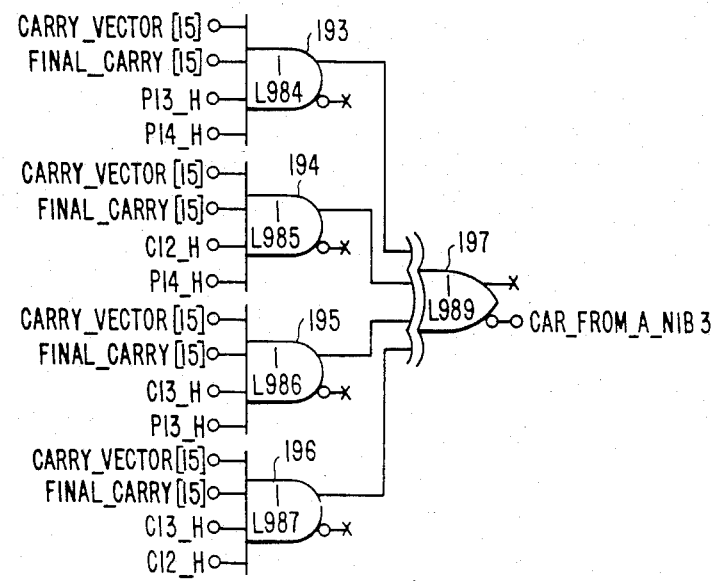

BCD ADDER CIRCUIT

BACKGROUND OF THE INVENTION

The present invention relates to a binary coded decimal (BCD) adder circuit.

Binary coded decimal numbers are used to represent decimal numbers in a form readily understood by both man (decimal) and computer (binary). There are sixteen possible bit combinations using four binary bits, but only ten are valid BCD digits. Therefore, when two BCD digits are added and the sum digit exceeds nine, that sum digit must be adjusted to a valid BCD digit. This is generally done by adding the constant $0110_2(6_{10})$ to the sum.

Traditionally, BCD adder circuits have used logic to detect whether a BCD sum should be adjusted after the addition has been completed. For example, whenever the unadjusted sum of two BCD digits produced a carry-out (i.e., when the sum exceeds fifteen), the sum was corrected by adding $0110_2$. Also, an adjustment was needed whenever bit positions 8 and 4 of the BCD sum were both one's (values $12_{10}$–$15_{10}$) or when bit positions 8 and 2 were both one's (values $10_{10}$ and $11_{10}$).

Traditional BCD adder circuits, for example, such as the circuit 10 shown in FIG. 1, use standard four-bit binary adders to add two BCD digits to produce an intermediate sum ($Z_8, Z_4, Z_2, Z_1$). The adder circuit also includes correction logic for each intermediate sum digit greater than nine. In the circuit shown in FIG. 1, a first four-bit operand, bits $a(0)_8$ to $a(0)_1$, and a second four-bit operand, bits $b(0)_8$ to $b(0)_1$, are input in parallel to full adder 15 along with the $C_{in}$ or carry-in bit. The output from full adder 15 includes a four-bit sum vector Z ($Z_8$ to $Z_1$) and a carry-out $C_{out}$. If $C_{out}$ is "1" or if either $Z_8$ and $Z_4$ are both "1" (AND gate 20) or $Z_8$ and $Z_2$ are both "1" (AND gate 25), the BCD adder circuit 10 produces a $C(0)_{out}$ BCD carry from OR gate 30 and the sum vector Z is corrected by adding a value of "$0110_2$" to the sum vector Z. When $C(0)_{out}$ is a "1" the B input of second full adder 35 receives a "$0110_2$" value while the sum vector Z is received at the A input of full adder 35. The output of full adder 35, $S(0)_8$ to $S(0)_1$, is the adjusted BCD sum of the original two operands.

As is apparent, traditional BCD adder circuits of present advanced VLSI technology, utilizing a carry-propagate full adder circuit such as 10, have a great amount of delay associated with them due to the display associated with propagation of carries through the adder circuitry (15, 35) and the delay associated with the correction circuitry (gates 20, 25, and 30). The delay associated with traditional carry-propagate full adder circuits, such as 15 and 35, is equal to:

Delay=log$_2$ (operand width, i.e., number of bits per operand).

Therefore, the delay associated with adders 10 and 35 is equal to log$_2$(4), or two units of delay. The delay associated with the correction circuitry is equal to two units of delay since there are two gate levels to the circuit for a total delay of four units for the adder of FIG. 1. As the width of the operand increases, for example, when two 32-bit operands are to be added, the associated delay also increases. A traditional BCD adder circuit would require eight stages of carry-propagate full adders plus associated correction circuitry to perform the addition of two 32-bit operands, and thus, the associated delay could be as high as thirty-two units for this adder circuit.

SUMMARY OF THE INVENTION

It is therefore an object of the present invention to provide a BCD adder circuit which reduces the time required to perform a BCD addition of two numbers.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the BCD adder circuit of this invention for adding a first and a second BCD operand and for producing a BCD sum comprises: binary adder means, having inputs connected to receive the first and second operands and a BCD precorrection factor, for producing an intermediate sum vector and an intermediate carry vector; carry-look-ahead means, having inputs connected to receive the intermediate sum vector and the intermediate carry vector, for producing a propagate vector and a final carry vector; and correction means, having inputs connected to receive the intermediate carry vector, the final carry vector, the propagate vector and a BCD correction factor, for producing the BCD sum by conditionally modifying the propagate vector according to the BCD correction factor based on the intermediate and final carry vectors.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1:
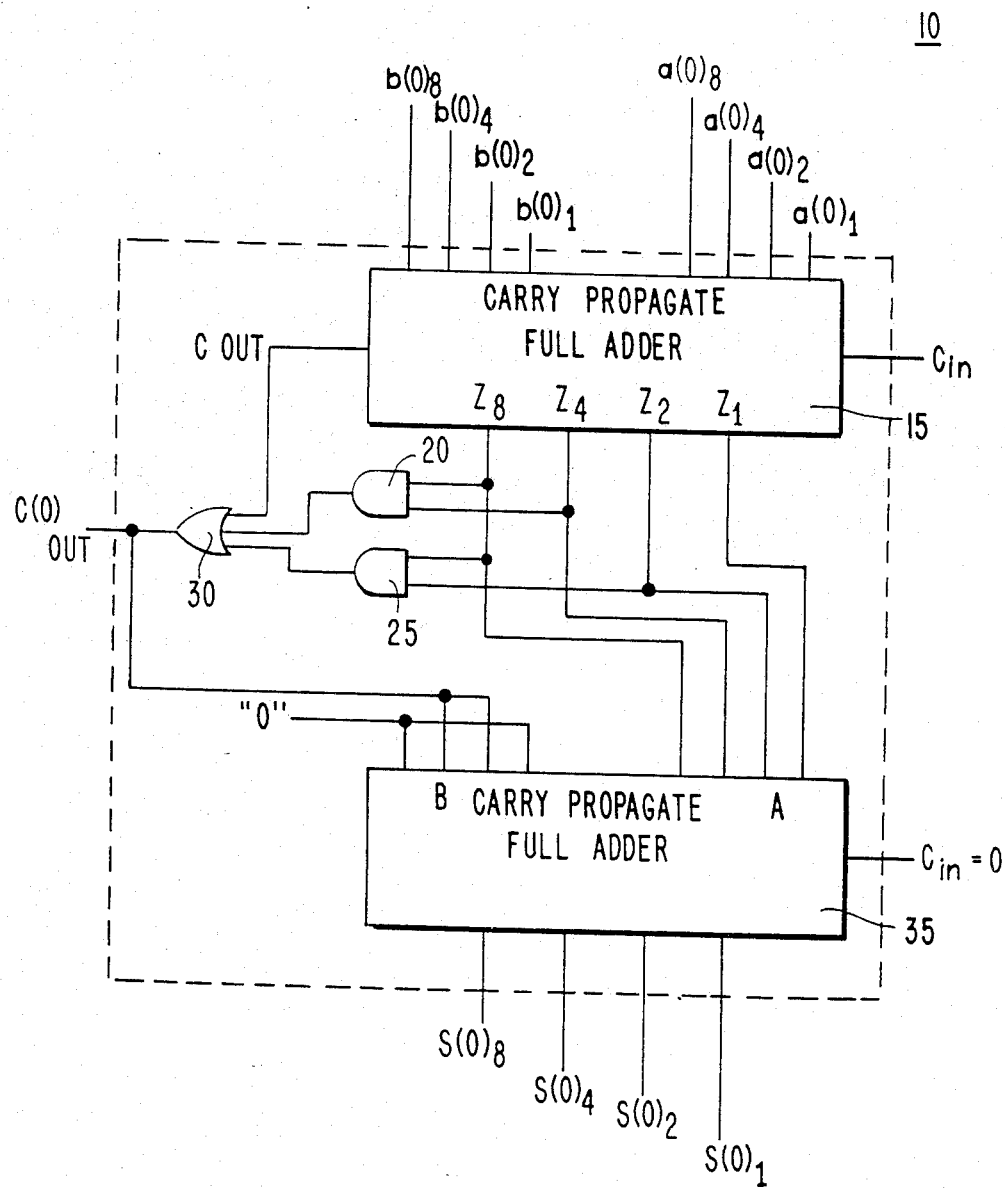
FIG. 1 is a logic diagram illustrating a prior art BCD adder circuit.

Reference will now be made in detail to the present preferred embodiment of the invention, an example of which is illustrated in the accompanying drawings in which like reference characters refer to corresponding elements.

The BCD adder circuit of the present invention reduces the time required to perform a BCD addition of two numbers by adding the two numbers and a BCD precorrection factor using a bank of full adders. The full adders each preferably add a corresponding BCD digit together with a correction factor of $0110_2$. The carry-out terms from each full adder are not rippled to higher order bits, thus reducing propagation delay caused by the ripple carry effect, but are instead considered at an intermediate stage of circuitry. That intermediate stage is then used to perform the traditional full carry propagate in an add operation and produce propagate terms and final carry terms. The add operation in this stage, however, does not yield the final result because the carry terms must be examined to see the propriety of adding the precorrection factor at the first stage. In the final stage of circuitry, the carry terms from both previous stages are examined to determine whether to modify the propagate and final carry terms by a BCD correction factor, $1010_2$, to undo the effects of the precorrection factor and produce the correct BCD sum. Thus, only one total addition operation is needed, thereby reducing the units of delay and providing a significant increase in the speed of operation.

Figure 2:
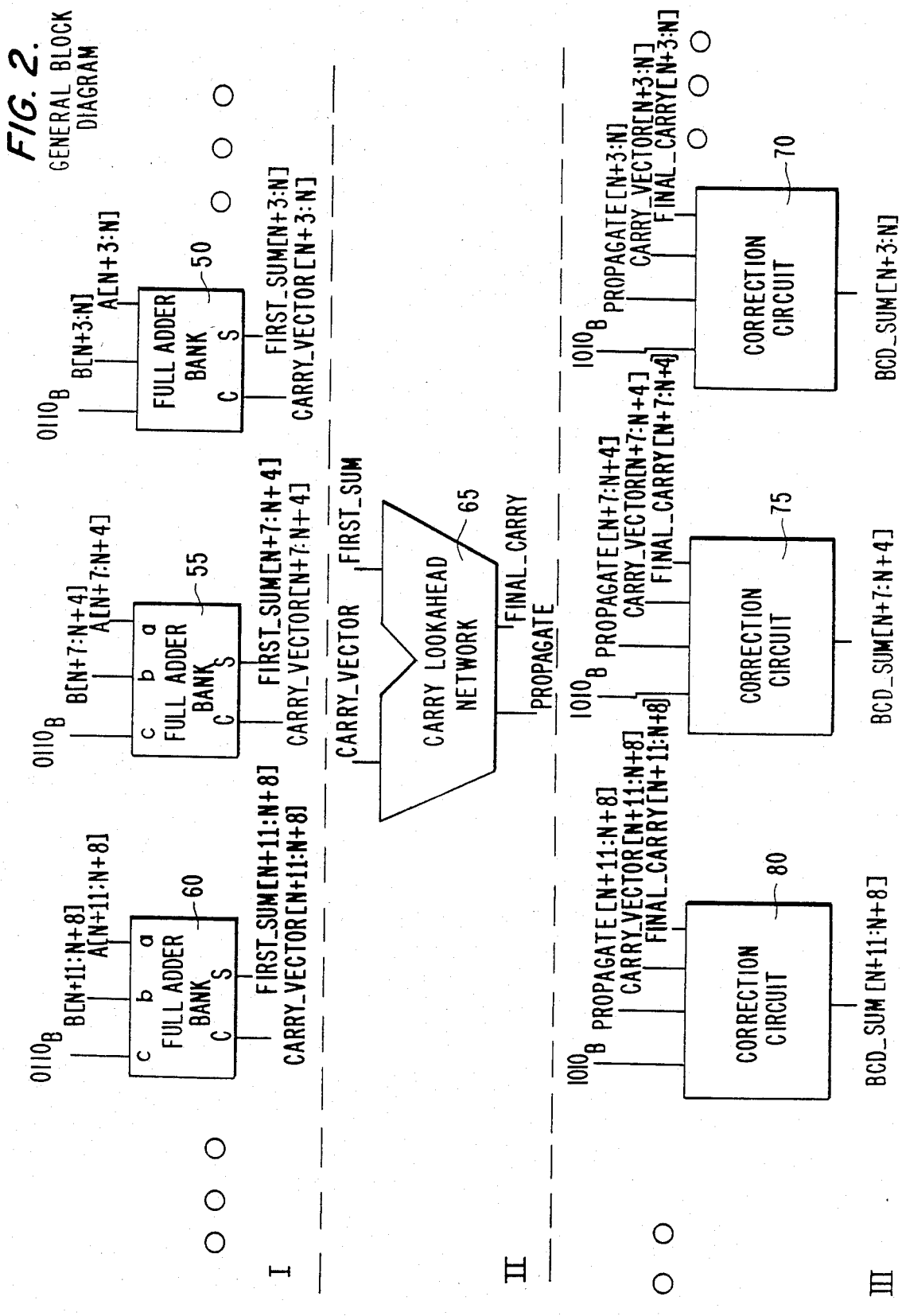
FIG. 2 is a general block diagram illustrating a BCD adder circuit in accordance with a preferred embodiment of the present invention.

FIG. 2 is a general block diagram illustrating a preferred embodiment of the BCD adder circuit of the present invention for adding a first and a second BCD operand and for producing a BCD sum. In accordance with the present invention the BCD adder includes binary adder means, having inputs connected to receive the first and second operands and a BCD precorrection factor, for producing an intermediate sum vector and an intermediate carry vector. As embodied in FIG. 2, such adder means includes as stage I a plurality of full adder circuits, three of which, adders 50, 55, and 60 are shown.

In stage I, addend A, addend B, and a BCD precorrection factor, are input to parallel full adder circuits circuits 50, 55, and 60. The addends A and B are grouped on a nibble (4 bit) basis and each full adder circuit is capable of adding two four bit binary operands plus a four bit precorrection factor preferably equal to $0110_2(6_{10})$. As shown in FIG. 2, the convention X[M:N] is used to represent bits M through N of signal X where N is the least significant bit. Thus, X[N+3:N] represents four consecutive bits of signal X where N is the least significant bit.

The precorrection factor is received at the input traditionally used to receive the carry bits from a previous adder. The full adder circuits in stage I produce an intermediate sum vector FIRST_SUM, which represents the sum of the operands A and B and the precorrection factor, and an intermediate carry vector CARRY_VECTOR which represents the carry bit from each single bit addition.

Figure 3:
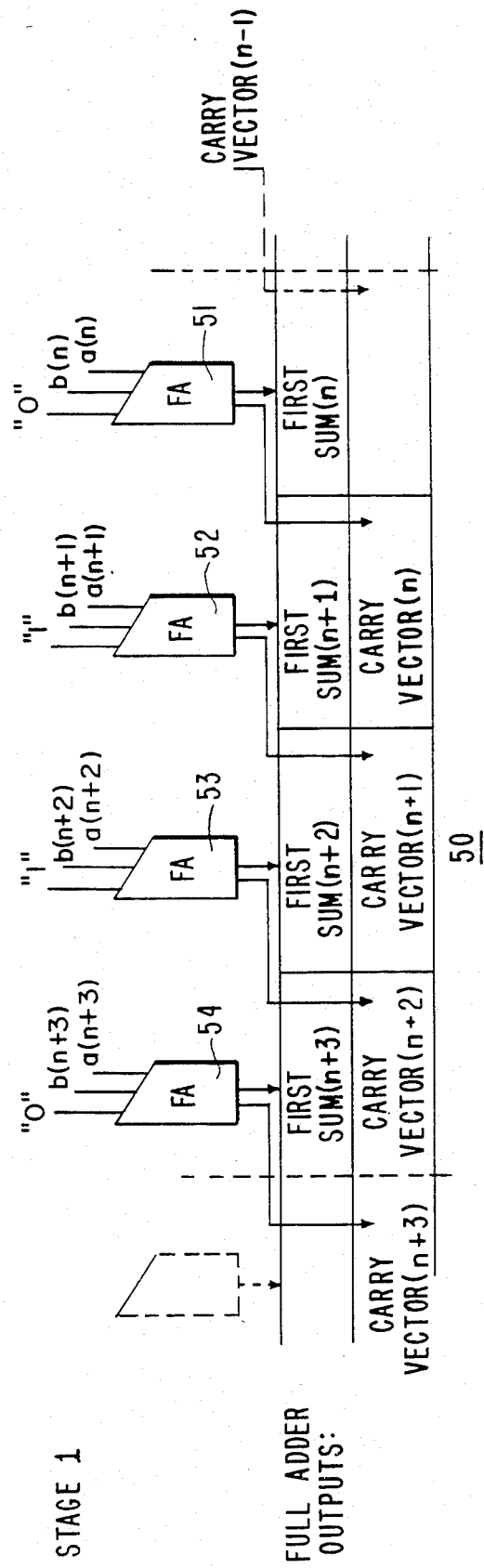
FIG. 3 is a more detailed block diagram of a full adder of the first stage of the BCD adder circuit of FIG. 2.

FIG. 3 is a detailed block diagram of full adder circuit 50 from stage I. The BCD encoded operands A and B are grouped on nibble, or four bit, boundaries shown respectively in FIG. 3 as a(n+3):a(n) and b(n+3):b(n).

Each full adder circuit in stage I preferably includes a plurality of parallel single bit full adders shown as elements 51, 52, 53, and 54 for full adder circuit 50 of FIG. 2. The BCD precorrection factor, $0110_2$, which is added to each nibble or BCD digit, represents the difference between binary-based and decimal-based numbers within a nibble. A full adder circuit for operands A and B with carry input C is defined by the following two equations:

$$\text{SUM}(i) = a(i) \text{ XOR } b(i) \text{ XOR } c(i) \quad (1)$$

$$\text{CARRY}(i) = (a(i) \text{ AND } b(i)) \text{ OR } (b(i) \text{ AND } c(i)) \text{ OR } (a(i) \text{ AND } c(i)) \quad (2)$$

As indicated above, in full adder circuit 50, as well as for each full adder circuit in FIG. 2, the carry input C is not connected to receive a true carry, but rather to receive the BCD precorrection factor "$0110_2$." Therefore, for full adder circuit 50 corresponding to a nibble containing bit positions n+3 through n:

| | |
|---|---|
| FOR POSITION n: | SUM(n) = a(n) XOR b(n) XOR "0"<br>= a(n) XOR b(n)<br>CARRY(n) = [a(n) AND b(n)] OR [b(n) AND "0"] OR [a(n) AND "0"]<br>= [a(n) AND b(n)] |
| FOR POSITION n+1: | SUM(n+1) = a(n+1) XOR "1" XOR b(n+1)<br>= NOT [a(n+1) XOR b(n+1)]<br>CARRY(n+1) = [a(n+1) AND b(n+1)] OR [b(n+1) AND "1"] OR [a(n+1) AND "1"]<br>= [a(n+1) OR b(n+1)] |
| FOR POSITION n+2: | SUM(n+2) = a(n+2) XOR b(n+2) XOR "1"<br>= NOT [a(n+2) XOR b(n+2)]<br>CARRY(n+2) = [a(n+2) AND b(n+2)] OR [b(n+2) AND "1"] OR [a(n+2) AND "1"]<br>= [a(n+2) AND b(n+2)] |
| FOR POSITION n+3: | SUM(n+3) = a(n+3) XOR b(n+3) XOR "0"<br>= [a(n+3) XOR b(b+3)]<br>CARRY(n+3) = [a(n+3) AND b(n+3)] OR [b(n+3) AND "0"] OR [a(n+3) AND "0"]<br>= [a(n+3) AND b(n+3)] |

The sum bits from each full adder circuit form a vector FIRST_SUM and the carry bits from each full adder circuit form a CARRY_VECTOR. Unlike conventional BCD adders, however, the carry inputs do not receive carry bits so there is no ripple propagation delay in this first stage. Furthermore, any propagation delay that may have been caused by the correction factor in the conventional BCD adder at a final stage is placed in the first stage in accordance with the present invention.

As shown in FIG. 3, the carry bit output from each full adder is shifted to correspond with the sum bit of the full adder for the next higher order bit. This is to align the FIRST_SUM vector and CARRY_VECTOR for the next stage.

The BCD adder circuit, in accordance with the present invention, also includes carry lookahead means, having inputs connected to receive the intermediate sum vector and the intermediate carry vector, for producing a propagate vector and a final carry vector. In the preferred embodiment of the invention in FIG. 2, a carry lookahead network 65 in stage II, receives the FIRST_SUM vector and CARRY_VECTOR from the full adders in stage I and produces a PROPAGATE vector and a FINAL_CARRY vector.

FIGS. 4-8 are a set of more detailed logic diagrams of stage II of the BCD adder circuit in FIG. 2. FIRST_SUM vector and CARRY_VECTOR are added together in carry lookahead network 65. The addition performed in network 65 is similar to that of traditional BCD adder circuits. As indicated above, the addition operation is not completed, however, because the bit propagate and bit carry terms become inputs for the circuitry of stage III to determine whether a BCD correction factor is needed.

FIG. 4-8 illustrate a particular carry lookahead design for an illustrative sixteen bits of a 32-bit design of circuit 65. Preferably, circuit 65 operates on nibbles. The first level of circuitry before the left most dashed line illustrates the production of bit propagate and generate terms. A bit is propagated, Pn=1, if a carry into the nth position will cause a carry out of the nth position. A bit is generated, Gn=1, if there is a carry out of the nth position regardless of whether or not there is a carry into the nth position. The bit propagate and bit generate terms are used to produce the FINAL__CARRY vector, as will be discussed in greater detail later. In FIGS. 4-7, bit positions 0-15 of FIRST__SUM vector and bit positions 0-14 of CARRY__VECTOR are treated as inputs to network 65. The generate function is defined as follows:

$$Gn = FIRST\_SUM[n] \text{ AND } CARRY\_VECTOR[n-1] \quad (3)$$

Therefore, Gn=1 when both FIRST__SUM[n] and CARRY__VECTOR[n] are 1.

The propagate function is defined as follows:

$$Pn = FIRST\_SUM[n] \text{ XOR } CARRY\_VECTOR[n-1] \quad (4),$$

where n is a bit position. Therefore, Pn=1 when either FIRST__SUM[n]=0 and CARRY__VECTOR[n]=1 or when FIRST__SUM[n]=1 and CARRY__VECTOR[n]=0. Preferably, negative logic is used in implementation because negative logic is faster than positive logic. However, it will be apprent to those skilled in the art that a circuit design based on positive logic may also be used.

Figure 4:
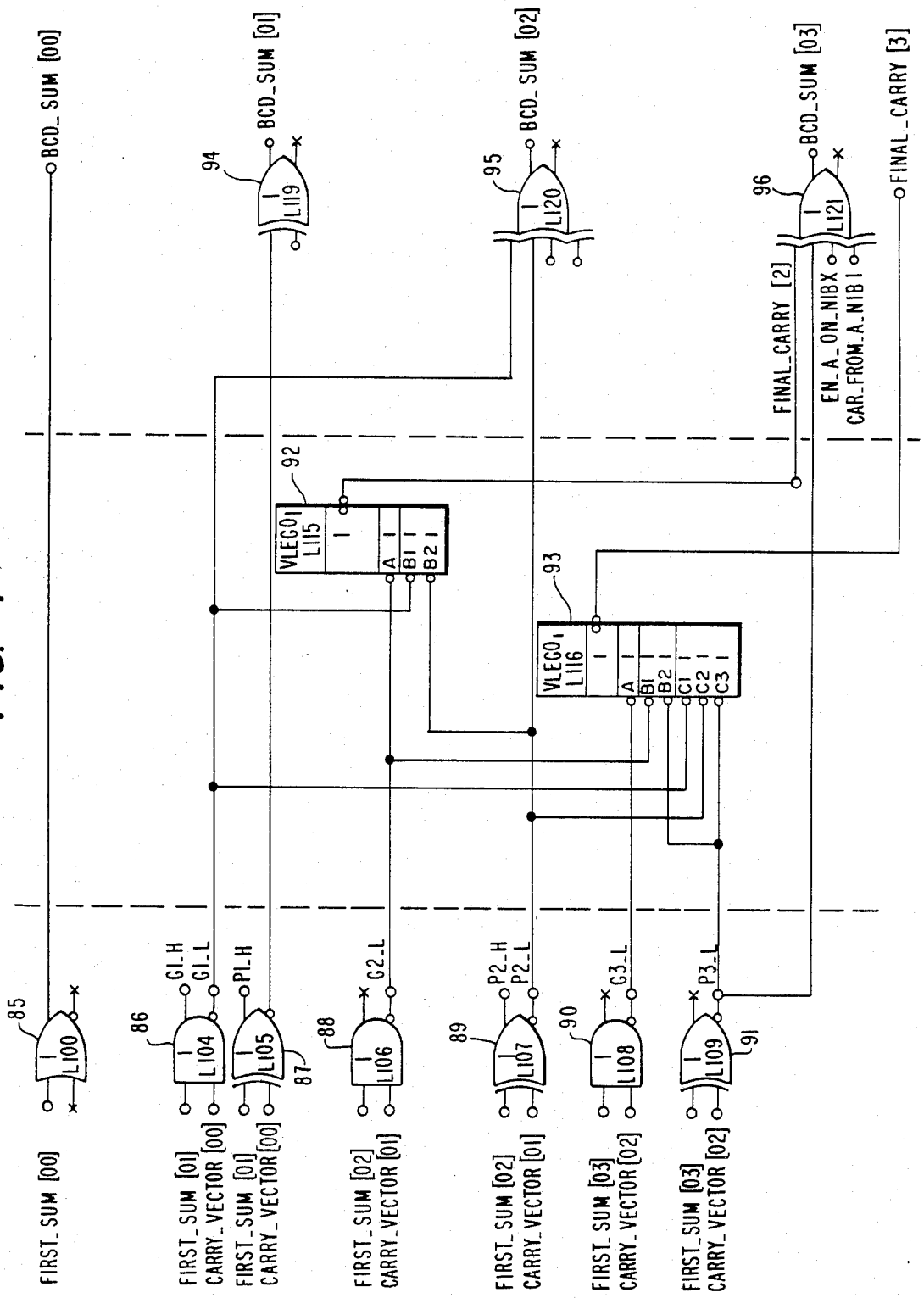
FIGS. 4–8 are more detailed logic diagrams of the carry lookahead network of the second stage of the BCD adder circuit of FIG. 2.

As shown in FIG. 4, for example, FIRST SUM[01] and CARRY__VECTOR[00] are input to AND gate 86 to produce G1 (generate bit 1) and are input to exclusive OR gate 87 to produce P1 (propagate bit 1). FIRST__SUM[02] and CARRY__VECTOR[01] are input to AND gate 88 to produce G2 and are input to exclusive OR gate 89 to produce P2. FIRST__SUM[03] and CARRY__VECTOR[02] are input to AND gate 90 to produce G3 and are input to exclusive OR gate 91 to produce P3. Such a pattern exists for all corresponding pairs of bits of FIRST__SUM and CARRY__VECTOR. However, the first bit of FIRST__SUM and the last bit of CARRY__VECTOR do not have a corresponding pair of P and G terms due to the 1-bit alignment shift of CARRY__VECTOR. The P terms from each single bit operation form the PROPAGATE vector.

The logic illustrated betweeen first gate level (the AND and XOR gates which produce the bit propagate and generate terms) and the last gate level (the XOR gates which produce the BCD__SUM) represents that used for the actual addition operation to produce the terms of the FINAL__CARRY vector. The addition operation performed at this part is similar to that performed in traditional binary adder circuits which add two operands and generate a sum and a carry-out which has propagated from all previous bit positions. However, the addition is not completed in the traditional manner of binary adders. In the traditional binary adders, the result is an exclusive OR of the PROPAGATE vector and the FINAL__CARRY vector. Instead, the bit terms of the PROPAGATE vector and the FINAL__CARRY vector are reserved for consideration at Stage III.

The three input logic chips 92, 107, 111, and 146 perform a logical AND operation on inputs B1 and B2 and a logical OR operation on the input A and the output result of the AND operation. The logical definition for this type of chip, using negative asserted logic, is as follows:

C=NOT((NOT B1 AND NOT B2) OR NOT A).

The six input logic chips 93, 108, 126, 129, 131, 132, and 148 perform a logical AND operation on the inputs B1 and B2 and a logical AND operation on the inputs C1, C2, and C3. The circuits then perform an OR operation on the input A and the output from the AND operations on the B and C inputs. The logical definition for this type of chip, using negative asserted logic, is as follows:

C=NOT((NOT C1 AND NOT C2 AND NOT C3) OR (NOT B1 AND NOT B2) OR NOT A).

Nine input logic chips 109, 110, 127, 130, 149, 150, 151, 152, and 154 perform a logical AND operation on the inputs B1 and B2, a logical AND operation on the inputs C1, C2, and C3, and a logical AND operation on the inputs D1, D2, D3, and D4. The circuits then perform a logical OR operation on the input A and the results from each AND operation. The logical definition for this type of chip, using negative asserted logic, is as follows:

C = NOT((NOT D1 AND NOT D2 AND NOT D3 AND NOT D4) OR (NOT C1 AND NOT C2 AND NOT C3) OR (NOT B1 AND NOT B2) OR NOT A).

This logic circuit is used to create the terms of the FINAL__CARRY vector as quickly as possible. The bit terms of the FINAL__CARRY vector must propagate through every bit position. As shown in FIGS. 4-7, as the bit position increases from least significant bit position 0 through most significant bit position 16, the number of logical terms required to produce the terms of the FINAL__CARRY vector also increases. Therefore, more sophisticated logic gates are used to produce the more significant bit terms and keep the number of logic levels and associated delay to a minimum.

Figure 5:
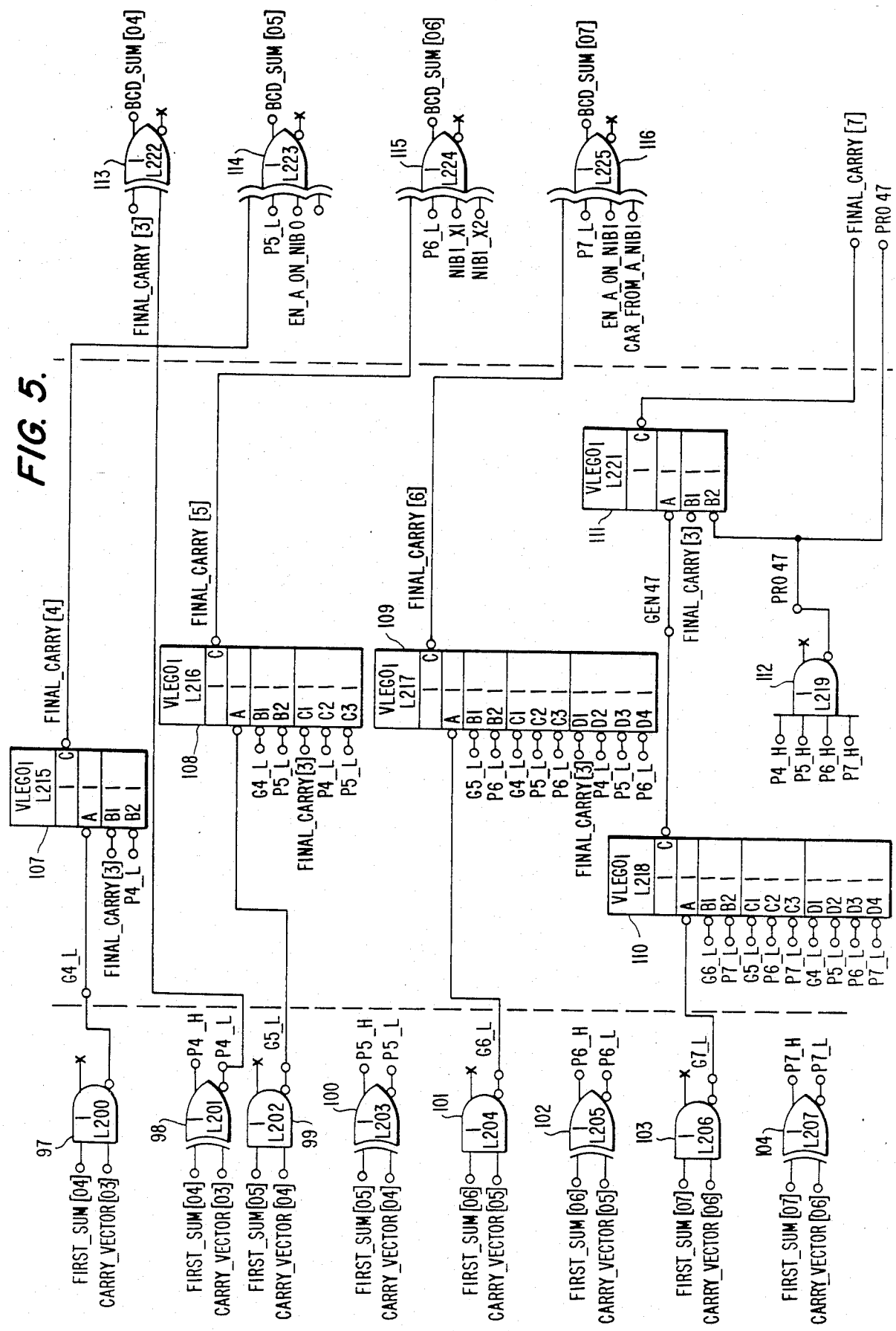
Figure 6:
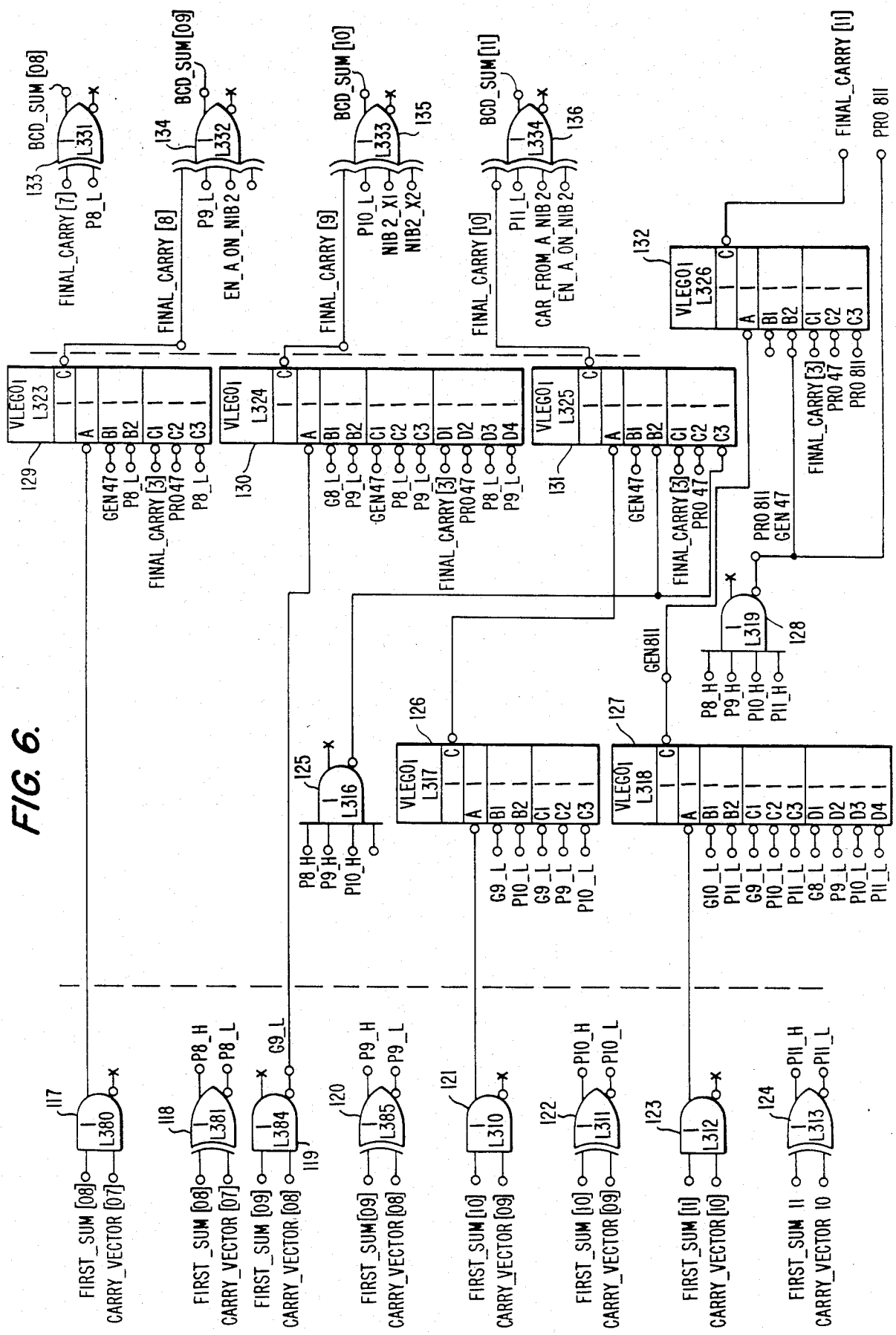

Bit propagate and bit generate terms may be grouped together in groups of four bit terms to create nibble propagate terms and nibble generate terms. For example, as shown in FIG. 5, AND gate 112 performs a logical AND operation on the input bit propagate terms P4, P5, P6 and P7 to produce a nibble propagate term PRO47, and, for example, as shown in FIG. 6, AND gate 128 performs a logical AND operation on the input bit propagate terms P8, P9, P10, and P11 to produce a nibble propagate term PRO811. Also, for example, as shown in FIG. 5, gate 110 outputs a nibble generate term, GEN47, which can be defined as follows, using positive notation for illustration (but being implemented using negative logic for speed):

GEN47=G7 OR (G6 AND P7) OR (G5 AND P6 and P7) OR (G4 AND P5 AND PG AND P7).

Similarly, gate 127 produces GEN811 and gate 149 produces GEN1215, which can be defined as follows:

GEN811=G11 OR (G10 AND P11) OR (G9 AND
P10 AND P11) OR (G8 AND P9 AND P10 AND
P11); and GEN1215=G15 OR (G14 AND P15) OR (G13
AND P14 AND P15) OR (G12 AND P13 AND
P14 AND P15).

The bit propagate and bit generate terms are used to produce the FINAL_CARRY vector. With reference to FINAL_CARRY[15] presented below, the FINAL_CARRY vector can be defined for a nibble containing bit positions n through n+3 as follows:

| | |
|---|---|
| FINAL_CARRY[n] = | G[n] OR (FINAL_CARRY[n−1] AND P[n]) |
| FINAL_CARRY[n+1] = | G[n+1] OR (G[n] AND P[n+1]) OR (FINAL_CARRY[n−1] AND P[n] AND P[n+1]) |
| FINAL_CARRY[n+2] = | G[n+2] OR (G[n+1] AND P[n+2]) OR (G[n] AND P[n+1] AND P[n+2]) OR (FINAL_CARRY [n−1] AND P[n] AND P[n+1] AND P[n+2]) |
| FINAL_CARRY[n+3] = | G[n+3] OR (G[n+2] AND P[n+3]) OR (G[n+1] AND P[n+2] AND P[n+3]) OR (G[n] AND P[n+1] AND P[n+2] AND P[n+3]) OR (FINAL_CARRY [n−1] AND P[n] AND P[n+1] AND P[n+2] AND P[n+3]) |

Figure 7A:
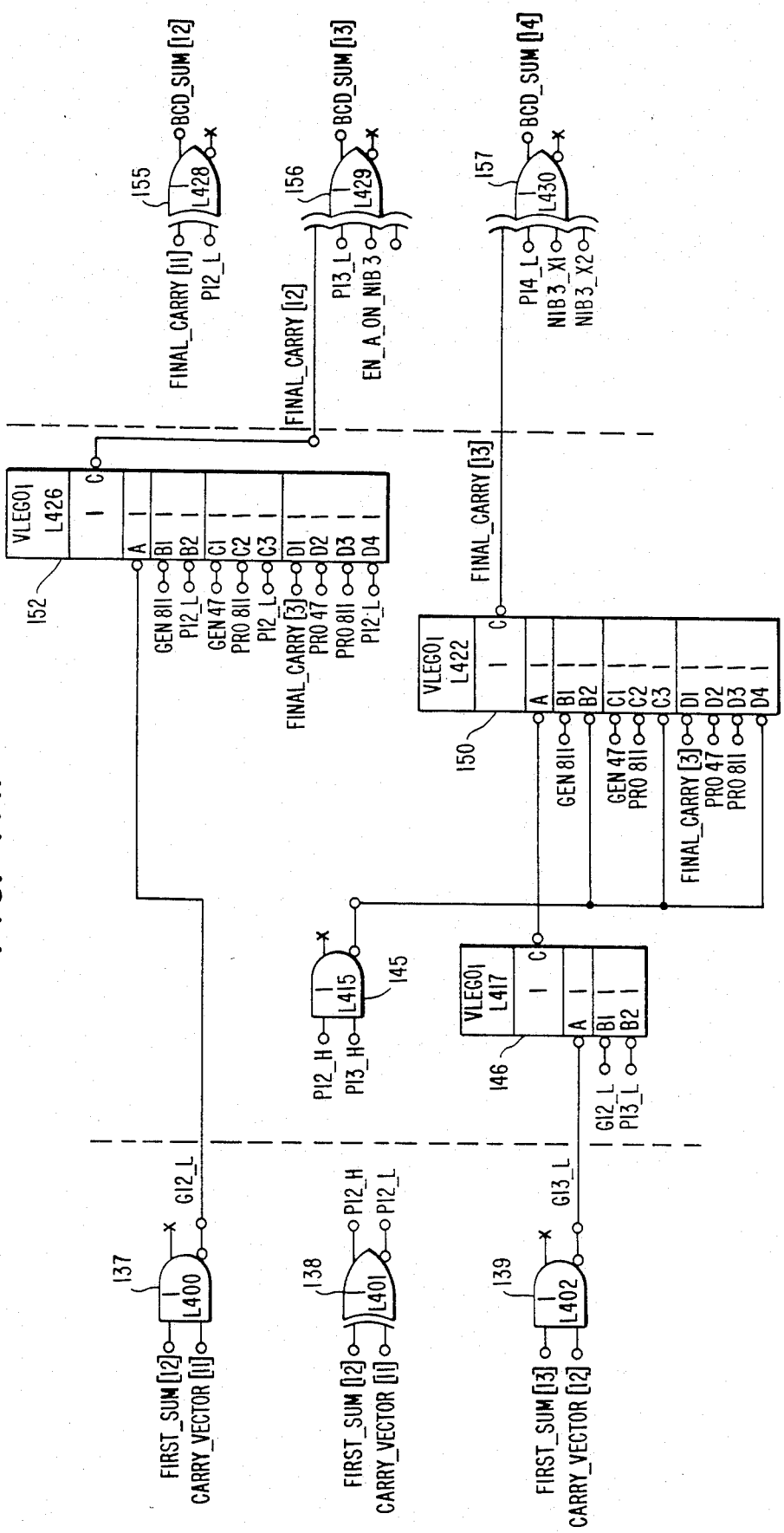
Figure 7B:
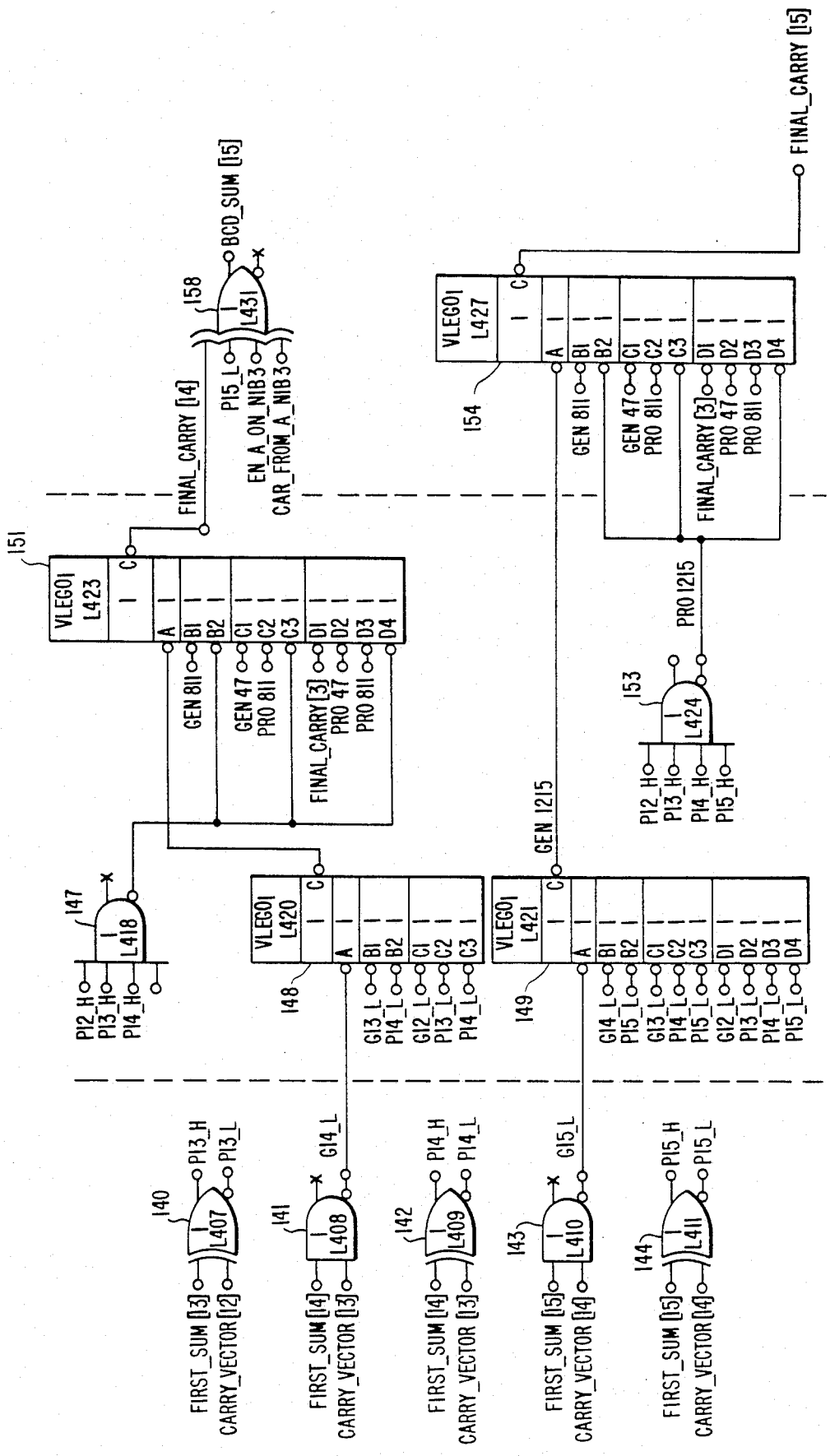

One example of the advantage of using nibble propagate and nibble generate terms, such as PRO811, GEN47, GEN1215, and PRO47, can be illustrated as shown by logic chip 154 in FIG. 7. Logic chip 154 receives as inputs GEN1215, GEN811, GEN47, PRO811, PRO47, AND FINAL_CARRY[3] and outputs FINAL_CARRY[15] which can be defined as follows:

| | |
|---|---|
| FINAL_CARRY[15] = | GEN1215 OR (GEN811 AND PRO1215) OR (GEN47 AND PRO811 AND PRO1215) OR (FINAL_CARRY[3] AND PRO47 AND PRO811 AND PRO1215). |

As illustrated in FIGS. 4–8, a carry lookahead design for adding two 32-bit operands will produce the FINAL_CARRY vector after 4 logic levels, assuming a worst case situation. This is a significant improvement in delay from traditional ripple adders which could have a delay of as many as thirty-two logic levels for the addition of two 32-bit operands.

In accordance with the present invention, the BCD adder circuit also includes correction means, having inputs connected to receive the intermediate carry vector, the final carry vector, the propagate vector and a BCD correction factor. The correction means produces the BCD sum by conditionally modifying the propagate vector and the final carry vector according to the BCD correction factor based on the intermediate and final carry vectors. In the preferred embodiment shown in FIG. 2, correction circuit 70, which is in stage III, receives the CARRY_VECTOR from stage I, and the FINAL_CARRY vector and the PROPAGATE vector from stage II, and a BCD correction factor, $1010_2$ ($10_{10}$), to produce the BCD sum. If, for a nibble, neither the most significant bit of a particular nibble from the FINAL_CARRY vector is "1" nor the most significant bit of the corresponding nibble from the CARRY_VECTOR is "1," the BCD correction factor is merged with the PROPAGATE vector in an exclusive OR function, in effect, to subtract out the precorrection factor added in stage I and produce the correct nibble value for BCD sum. If either of those two bits is "1" for a particular nibble, the BCD precorrection factor was correctly added in stage I, and therefore, the BCD sum is correctly represented as the PROPAGATE vector exclusively ORed with the FINAL_CARRY vector.

Figure 9:
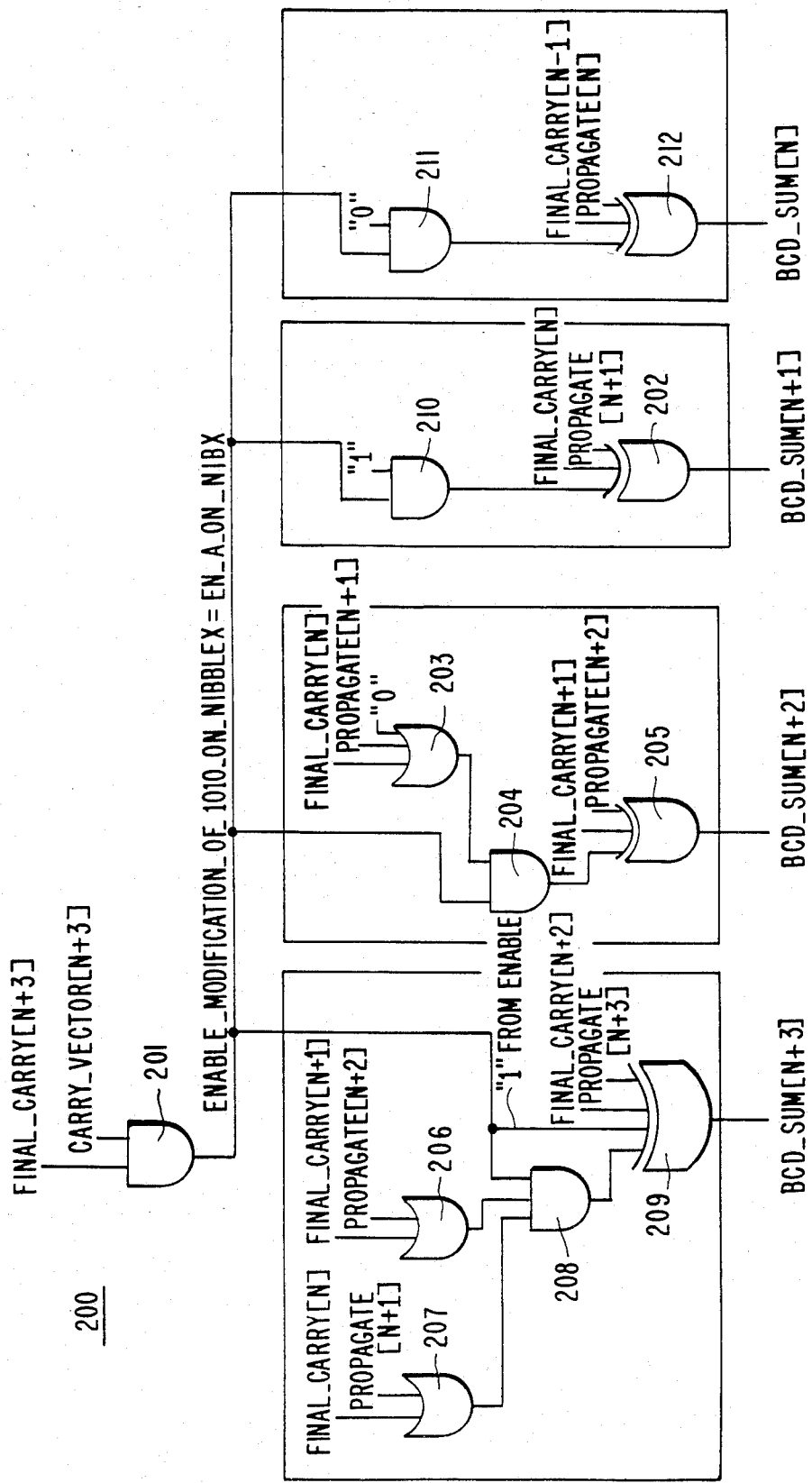
FIG. 9 is a more detailed logic diagram of the correction circuit of the third stage of the BCD adder circuit of FIG. 2.

FIG. 9 is a more detailed logic diagram of correction circuit 200 of the BCD adder circuit for one nibble. In general, correction circuit 200 uses the most significant bit of a particular nibble of the FINAL_CARRY vector and the CARRY_VECTOR to determine whether a particular nibble needed the BCD precorrection factor added. For some addition operations, the addition of the BCD precorrection factor $0110_2$ may not have been necessary. If the addition of the BCD precorrection factor did not create a carry out of a nibble, i.e., CARRY_VECTOR[n+3] is not set, it may have created an incorrect BCD sum. For example, when the numbers 1 and 5 are added, the answer would be the same for both base 10 and base 16 (i.e., four bit binary) operations. In accordance with the present invention, however, the BCD precorrection factor was added to the operands in stage I. Therefore, the unneeded $0110_2$ must be subtracted. This is done by adding $1010_2$ ($10_{10}$).

| EXAMPLE: 1+5: In stage I this would be: | 0001 |
|---|---|
| | 0101 |
| | + 0110 |
| In stage II: | 0010: SUM |
| | + 0101 : CARRY |
| This result is incorrect: | 1100 |
| Add in the BCD correction factor: | + 1010 |
| The corrected decimal sum: | 0110 |

The BCD correction factor is only added to a nibble if both the most significant bit of a particular nibble of the CARRY_VECTOR and the most significant bit of a particular nibble of the FINAL_CARRY vector are not set. If either carry bit is set, the BCD precorrection factor was correctly added so the BCD correction factor is not added.

FIG. 9 illustrates a correction circuit, for example correction circuit 70, and illustrates how each bit position in a nibble is modified if the BCD correction factor is enabled. An enable signal, ENABLE_MODIFICATION_OF_1010_ON_NIBBLEx-=EN_A_ON_NIBx, where A=$1010_2$, is generated from AND gate 201, where FINAL_CARRY[n+3] and CARRY_VECTOR[n+3] are inputs. If neither carry is set, then EN_A-ON_NIBx is set, and the BCD correction factor is added to this nibble. The BCD_SUM for this nibble is modified as follows:

BCD_SUM[n] is not affected by the correction factor because exclusively ORing zero with FINAL_CARRY[n−1] and PROPAGATE[n] will not affect the result.

BCD_SUM[n+1] (EN_A_ON_NIBx AND "1") XOR FINAL_CARRY[n] XOR PROPAGATE[n+1]

BCD_SUM[n+2] is produced from exclusive OR gate 205 with inputs FINAL_CARRY[n+1], PROPAGATE[n+2], and the output of AND gate 204. If the BCD correction factor is enabled, the addition of "1" to bit position [n+1] would cause a carry into bit position [n+2] if either FINAL_CARRY[n] or PROPAGATE[n+1] is set. OR gate 203 makes this determination. AND gate 204 receives the output of OR gate 203 and allows the output of OR gate 203 to be used if EN_A_ON_NIBx is set.

BCD_SUM[n+3] is produced from exclusive OR gate 209 with inputs FINAL_CARRY[n+2], PROPAGATE[n+3], EN_A_ON_NIBx, and the output of AND gate 208. If the BCD correction factor is enabled, a "1" is added to bit position [n+3]. The addition of the "1" is performed by exclusively ORing the enable signal with the other terms which produce the BCD_SUM, i.e., FINAL_CARRY[n+2] and PROPAGATE[n+3]. The output of AND gate 208 is another term which needs to be considered if the enable signal is set because if adding "1" to bit position [n+1] produced a carry, which is then propagated through bit position [n+2], it could cause a carry into bit position [n+3]. OR gates 206 and 207 check to determine whether a carry would be generated from bit position [n+1] if the enable is set.

Figure 8A:
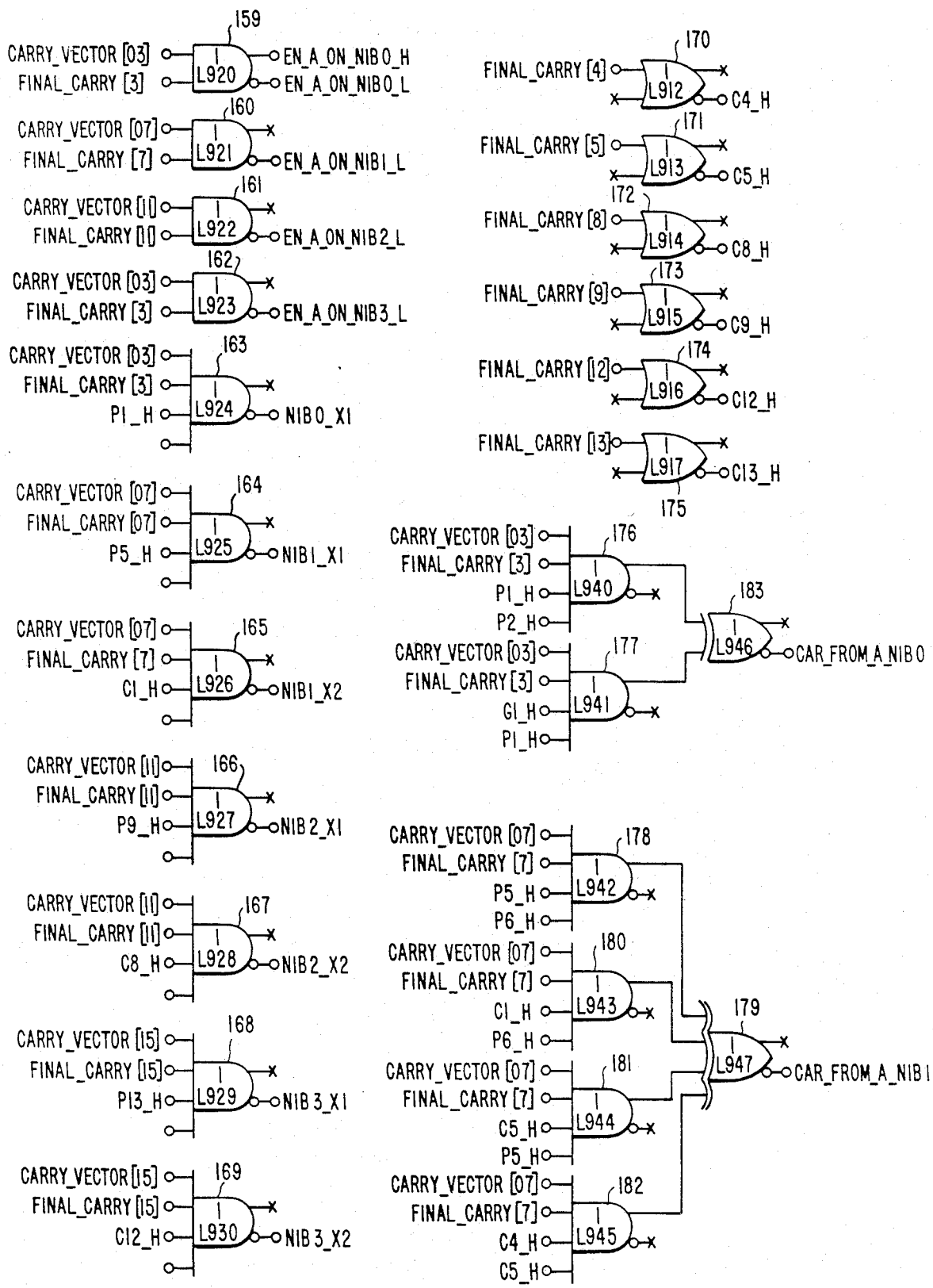

FIG. 8 illustrates the generation of the enable signals used in correction circuit 70. For example, EN_A_ON_NIB0 is produced from AND gate 159, EN_A_ON_NIB1 from AND gate 160, EN_A_ON_NIB2 from AND gate 161, and EN_A_ON_NIB3 from AND gate 162. The outputs from gates 159-162 are used as shown in FIGS. 4-7 as inputs to exclusive OR gates 94, 96, 114, and 116 in the last logic level to produce a corresponding bit of BCD_SUM.

In the preferred embodiment, as shown in FIG. 8, NIBy_X1 and NIBy_X2 are generated from 4-input AND gates, for example, 163 and 164. These signals correspond to the net result of gates 203 and 204 in FIG. 9, and can be defined as follows:

NIBy_X1 = CARRY_VECTOR[n+3] AND
FINAL_CARRY [n+3] AND
PROPAGATE[n+1])

NIBy_X2 = CARRY_VECTOR[n+3] AND
FINAL_CARRY [n+3] AND (NOT
FINAL_CARRY[n])

The signal CAR_FROM_NIBy, shown in FIG. 8, is a signal which relates to the output of gate 208 of FIG. 9 as used in the preferred embodiment. However, another design could be used which would obtain the same results. The signal CAR_FROM_NIBy can be defined as follows:

CAR_FROM_A_NIBy = NOT(A XOR B XOR C XOR D), where
A = (CARRY_VECTOR[n+3] AND FINAL_CARRY[n+3] AND PROPAGATE[n+1] AND PROPAGATE[n+2])
B = (CARRY_VECTOR[n+3] AND FINAL_CARRY[n+3] AND FINAL_CARRY[n] AND PROPAGATE[n+2])
C = (CARRY_VECTOR[n+3] AND FINAL_CARRY[n+3] AND FINAL_CARRY[n+1] AND PROPAGATE[n+1])
D = (CARRY_VECTOR[n+3] AND FINAL_CARRY[n+3] AND FINAL_CARRY[n] AND FINAL_CARRY[n+1])

Traditional BCD adder circuits performed the BCD addition operation in ten to twenty-six logic levels for 32-bit operands. The BCD adder circuit of the present invention reduces the necessary logic levels to seven because only one full addition operation is performed. The circuit adds in a BCD precorrection factor at the initial stage and manipulates the carry terms from intermediate levels of addition in order to determine if BCD correction is necessary for the BCD sum digits. The BCD adder circuit of the present invention is advantageous as the number of bits of each operand increases. The carry terms of the first and last stages are not propagated through between nibbles, thereby further increasing the speed of operation.

It will be apparent to those skilled in the art that various modifications and variations can be made in the method and apparatus of the present invention without departing from the scope or spirit of the invention. Thus, it is intended that the present invention cover the modifications and variations of this invention provided they come within the scope of the appended claims and their equivalents.

What is claimed is:

1. A BCD adder circuit for adding a first and a second BCD operand and for producing a BCD sum, comprising:
   binary adder means, having inputs connected to receive the first and second operands and a BCD precorrection factor, for producing an intermediate sum vector and an intermediate carry vector;
   carry lookahead means, having inputs connected to receive the intermediate sum vector and the intermediate carry vector, for producing a propagate vector and a final carry vector; and
   correction means, having inputs connected to receive the intermediate carry vector, the final carry vector, the propagate vector and a BCD correction factor, for producing said BCD sum by conditionally modifying said propagate vector and said final carry vector according to said BCD correction factor based on said intermediate and final carry vectors.

2. The BCD adder circuit of claim 1 wherein said adder means includes a plurality of parallel full adder circuits, each of said full adder circuits being connected to receive as inputs a unique set of successive bits of said first operand, a unique and corresponding set of successive bits of said second operand, and a corresponding portion of said precorrection factor, said plurality of full adder circuits each providing as an output a unique set of successive bits of said intermediate sum vector, and a unique set of successive bits of said intermediate carry vector.

3. The BCD adder circuit of claim 2 wherein said unique set of successive bits of said first operand is equal to four bits, said unique set of successive bits of said second operand is equal to four bits, and wherein each of said full adder circuits is comprised of four parallel 1-bit full adders, each of said full adders receiving as inputs four bits of said first operand, four bits of said second operand and four bits of said BCD precorrection factor and outputting four bits of said intermediate sum vector and four bits of said intermediate carry vector.

4. The BCD adder circuit of claim 3 wherein each portion of said precorrection factor is equal to 0110 in binary.

5. The BCD adder circuit of claim 1 wherein said carry lookahead means is comprised of a plurality of sets of discrete logic elements, each of said sets of discrete logic elements being connected to receive as inputs a unique set of successive bits of said intermediate carry vector and of said intermediate sum vector and each of said sets of discrete logic elements providing as an output a unique set of successive bits of said propagate vector and a unique set of bits of said final carry vector.

6. The BCD adder circuit of claim 1 wherein said correction means includes
a plurality of parallel OR gates, each of said OR gates being connected to receive as inputs one bit of said intermediate carry vector and one bit of said final carry vector, and each said OR gate also generating an output,
a plurality of AND gates, each corresponding to a different one of said OR gates and each being connected to receive as inputs the output of said corresponding OR gate and one bit of said BCD correction factor, each said AND gate also generating an output, and
a plurality of exclusive OR gates, each of said exclusive OR gates connected to receive as inputs said output of said corresponding AND gate and a unique bit of said propagate vector, said plurality of exclusive OR gates outputting a unique bit of said BCD sum.

7. The BCD adder circuit of claim 6 wherein said correction factor is equal to 1010 in binary.

8. A BCD adder circuit for adding a first and a second BCD encoded operand, said first and second operands being grouped in a plurality of nibbles, each of said nibbles being a unique group for four successive bits, said BCD adder circuit for producing a BCD sum, comprising:
a plurality of parallel full adder circuits, each of said full adder circuits being connected to receive as inputs one nibble of said first operand, one nibble of said second operand, and a BCD precorrection factor equal to 0110 in binary, said pluality of full adder circuits each providing as an output a unique set of successive bits of an intermediate sum vector equal to four bits, and a unique set of successive bits of an intermediate carry vector equal to four bits;
a carry lookahead circuit including a plurality of series of discrete logic elements, each of said series of discrete logic elements connected to receive as inputs a unique set of successive bits of said intermediate carry vector and said intermediate sum vector, each of said series of discrete logic elements providing as an output a unique set of successive bits of a propagate vector and a unique set of bits of a final carry vector; and
a correction circuit including
a plurality of parallel OR gates, each of said OR gates being connected to receive as inputs one bit of said intermediate carry vector and one bit of said final carry vector, each of said OR gates also generating an output,
a plurality of AND gates, each corresponding to a different one of said OR gates and each being connected to receive as inputs the output of said corresponding OR gate and one bit of a BCD correction factor equal to 1010 in binary, each said AND gate also generating an output, and
a plurality of exclusive OR gates, each of said exclusive OR gates connected to receive as inputs said output of said corresponding AND gate, a unique bit of said propagate vector and a unique bit of said final carry vector, each of said plurality of exclusive OR gates outputting a unique bit of said BCD sum.

9. A method for adding a first and a second BCD encoded operand and for producing a BCD sum using a BCD adder circuit in a computer system, said method comprising the steps of:
storing said first and second operands in a register;
producing an intermediate sum vector and an intermediate carry vector from an adding circuit;
producing a propagate vector and a final carry vector from a carry lookahead circuit, said carry lookahead circuit having inputs connected to receive said intermediate sum vector and said intermediate carry vector;
modifying said propagate vector according to said BCD correction factor and said final carry vector to form said BCD sum if said intermediate and final carry vectors have a predetermined relationship; and
modifying said propagate vector according to said final carry vector to form said BCD sum if said intermediate and final carry vectors do not have said predetermined relationship.

* * * * *